Jan. 10, 1933.   L. E. BROCIUS   1,893,576
CHANGE OVER DEVICE
Filed Dec. 22, 1931    4 Sheets-Sheet 1

INVENTOR
Lawrence E. Brocius
BY
Louis Prevost Whitaker
ATTORNEY

Jan. 10, 1933.  L. E. BROCIUS  1,893,576
CHANGE OVER DEVICE
Filed Dec. 22, 1931    4 Sheets-Sheet 2

Jan. 10, 1933.  L. E. BROCIUS  1,893,576
CHANGE OVER DEVICE
Filed Dec. 22, 1931  4 Sheets-Sheet 3

Lawrence E. Brocius INVENTOR
BY Louis Rurood Whitaker
ATTORNEY

Jan. 10, 1933.　　　　L. E. BROCIUS　　　　1,893,576
CHANGE OVER DEVICE
Filed Dec. 22, 1931　　　4 Sheets-Sheet 4
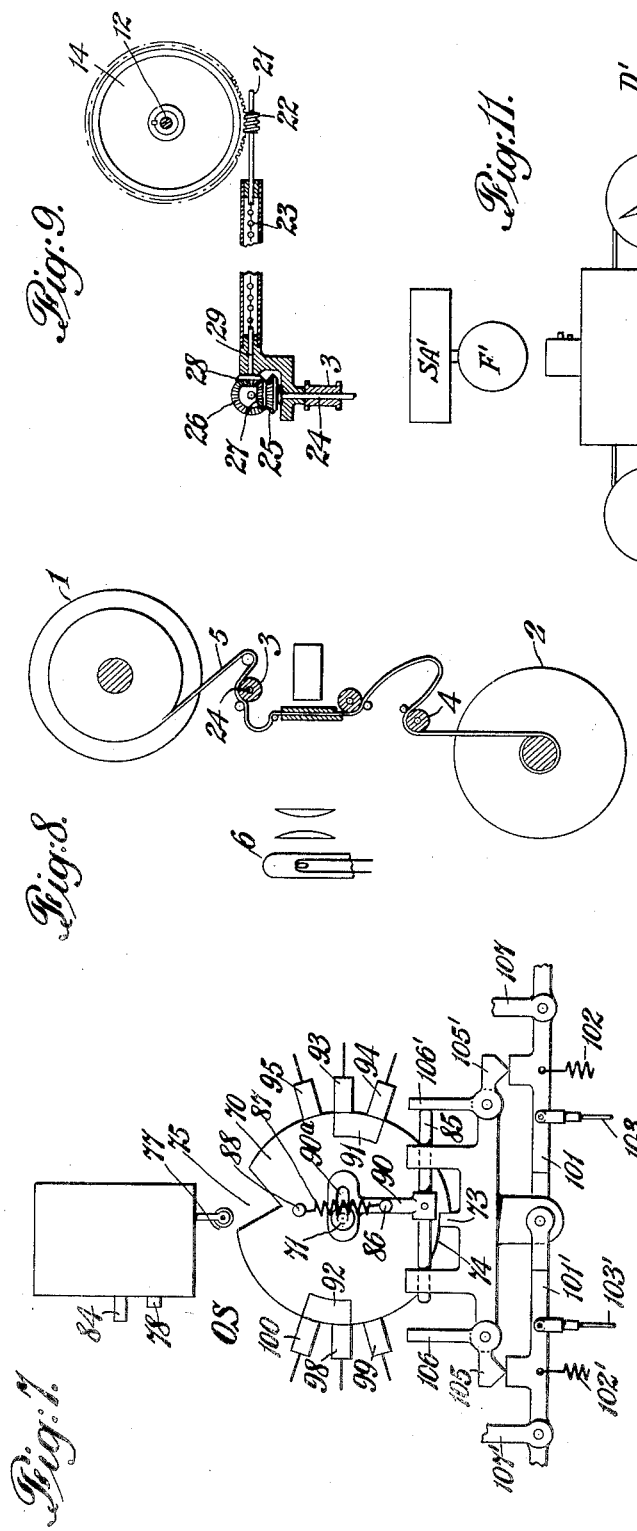
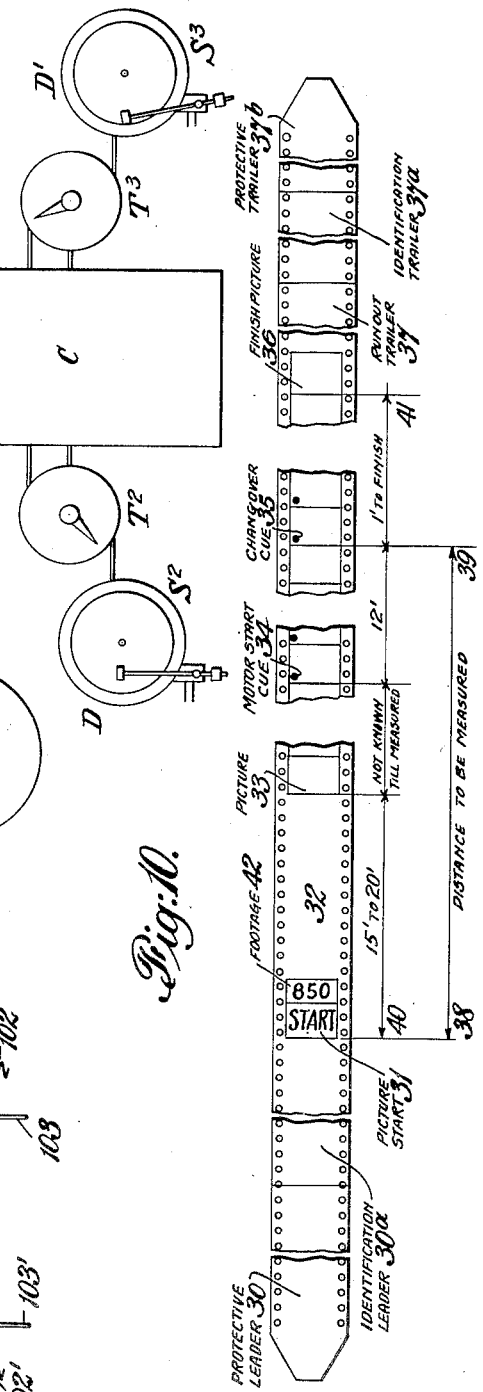
INVENTOR
Lawrence E. Brocius
BY
Louis Trevor Webster
ATTORNEY Patented Jan. 10, 1933

1,893,576

UNITED STATES PATENT OFFICE

LAWRENCE E. BROCIUS, OF SUMMERVILLE, PENNSYLVANIA

CHANGE OVER DEVICE

Application filed December 22, 1931. Serial No. 582,558.

My invention consists in the novel features hereinafter described, reference being had to the accompanying drawings which show one embodiment of my invention, selected by me for purposes of illustration, and the said invention is fully disclosed in the following description and claims.

In the operation of motion picture projection apparatus, it is customary to employ a plurality of projectors, usually two, trained upon the same screen, and to operate these projectors successively, so that a film can be removed from one projector and a new film inserted therein, while the other projector is in operation. As many picture films comprise a considerable number of separate strips or reels of film, it is necessary for interrupted projection, that the inoperative projector shall be brought into operation in exact timed relation with the operating projector, so that the first picture on the fresh reel of film shall take its consecutive position on the screen immediately after the last picture of the preceding reel. Where sound apparatus is employed, the like sequential operation of the sound apparatus for the successive films must also be secured. This result is at present ordinarily effected by hand operated control mechanism requiring the continuous presence of two operators, in conjunction with certain cue indications appearing upon the standard release prints, or films.

The object of my invention is to provide an automatic means for accomplishing this result, and insuring absolute accuracy in the sequential projection of successive films, while dispensing with the necessity of two operators and enabling the entire projection apparatus (with or without sound effects) to be performed and controlled by a single operator.

In carrying out my invention I provide each projector with a timing device, or timer, provided with a movable control element, moving in timed relation with the record (or film) driving mechanism of the projector, and constructed to bring into operation the record (or film) driving mechanism of the other projector at a predetermined time to permit it to acquire normal operating speed, and to effect the change over, from one projector to the other, both as to picture projection and sound effects, at an exactly predetermined point in the film in the connected projector, for which the timer is set. The movable control element of each timer can be detached temporarily from its driving means and set by hand, into the proper position for each particular film, by reference to a suitable scale having indications thereon, corresponding with the number of feet on the particular film to be shown by the connected projector, and said indications being conveniently marked to indicate multiples of linear feet of film passing the record driving mechanism with which the timer is connected. The proper setting of the timer will naturally vary for each film and is determined by measuring the distance from the part thereof indicating "picture start", separated by a predetermined length of film from the first picture, to the desired point for the change over, both of which positions are now marked on standard films. I contemplate that this measuring operation will be performed when the films are manufactured and the exact footage between the points mentioned will be marked in figures, preferably on the "picture start" space of the film, so that the operator, when he places a film in either projector need only glance at this figure and set the timer accordingly, after which he can start the projector, and employ the interval during which it is in operation to insert the succeeding film in the other projector, noting the footage between the points stated, and setting the timer of that projector to correspond therewith. Of course if the films are not marked at the factory, they will have to be measured by the usual footage counter and marked before showing.

Co-operating with the movable control element of each timer I provide means operated thereby for starting the record driving means and illuminating means of the other projector before said control element reaches its change over position, to allow said record driving apparatus to arrive at normal speed, during which time it is reeling off the said predetermined length of film preceding the first picture, and means operated at the instant of change over, for simultaneously opening the dowser of the controlled projector, and closing the dowser of the connected projector, and simultaneously switching the circuits for the production of sound effects, in like manner. Each timer control element is also provided with means for stopping the record driving mechanism of the projector with which it is connected, so that the timer remains inoperative while a succeeding reel of film is inserted, after which the timer control element is again set in accordance with the footage of said film, and remains otherwise inoperative until the projector with which it is connected, is started by the timer connected wih the other projector.

The controlling switches for closing the various electric circuits, under the control of the respective timers, are conveniently located between the timers, and I prefer to connect the timers with the record drive mechanisms of the respective projectors by connections, preferably in the form of flexible shafting of considerable length, so that both the timers and all switches controlled thereby are removed from proximity to the projectors, and the films used in connection therewith, so that danger of film fire is practically entirely prevented. Moreover, each timer is preferably driven by or in timed relation with the film feed sprocket, which withdraws the film from the supply reel. As the film is usually withdrawn from the upper reel, I have shown each timer connected with the upper film feed sprocket of the projector with which it is connected. It follows, therefore, that the action of the timer is always determined by the footage of the film withdrawn from the film supply reel and moved across the projector lens, and the timer cannot be brought into action to start the other projector and effect a change over until the proper footage for which the timer is set has been actually fed from the supply reel. My invention therefore avoids the objectionable features of devices in which electric contacts are made through apertures provided in the films, or by devices in contact with the film or the supporting reels, which devices present continual danger of film fires, and wear or injury to the films, and are also likely in many instances to be brought prematurely into action to produce a change over by the breaking of the film.

My invention also comprises certain novel features of construction and combination of parts hereinafter fully described and particularly pointed out in the claims.

Referring to the accompanying drawings, which show one embodiment of my invention, selected by me for purposes of illustration, Fig. 1 presents a schematic illustration of two projectors, in association with the respective timers, and devices operated thereby, and embodying my invention, the projectors which would normally occupy positions at right angles to the plane of the figure being turned sidewise for convenience of illustration.

Fig. 7 is an enlarged rear view of the circuit changing disc shown in Figs. 1 and 2.

Fig. 8 is a diagrammatic view illustrating the passage of film through the projector in engagement wth the usual upper and lower driving sprockets.

Fig. 9 is a detail illustrating the connection of the timer drive with the upper driving sprocket.

Fig. 10 is a plan view, partly broken away, illustrating the general construction and arrangement of a standard moving picture film, and showing the measured footage for setting the timer, marked thereon.

Fig. 11 is a diagrammatic view illustrating the application of my invention to the control of record drive mechanisms for records of the disc type.

Figure 1:
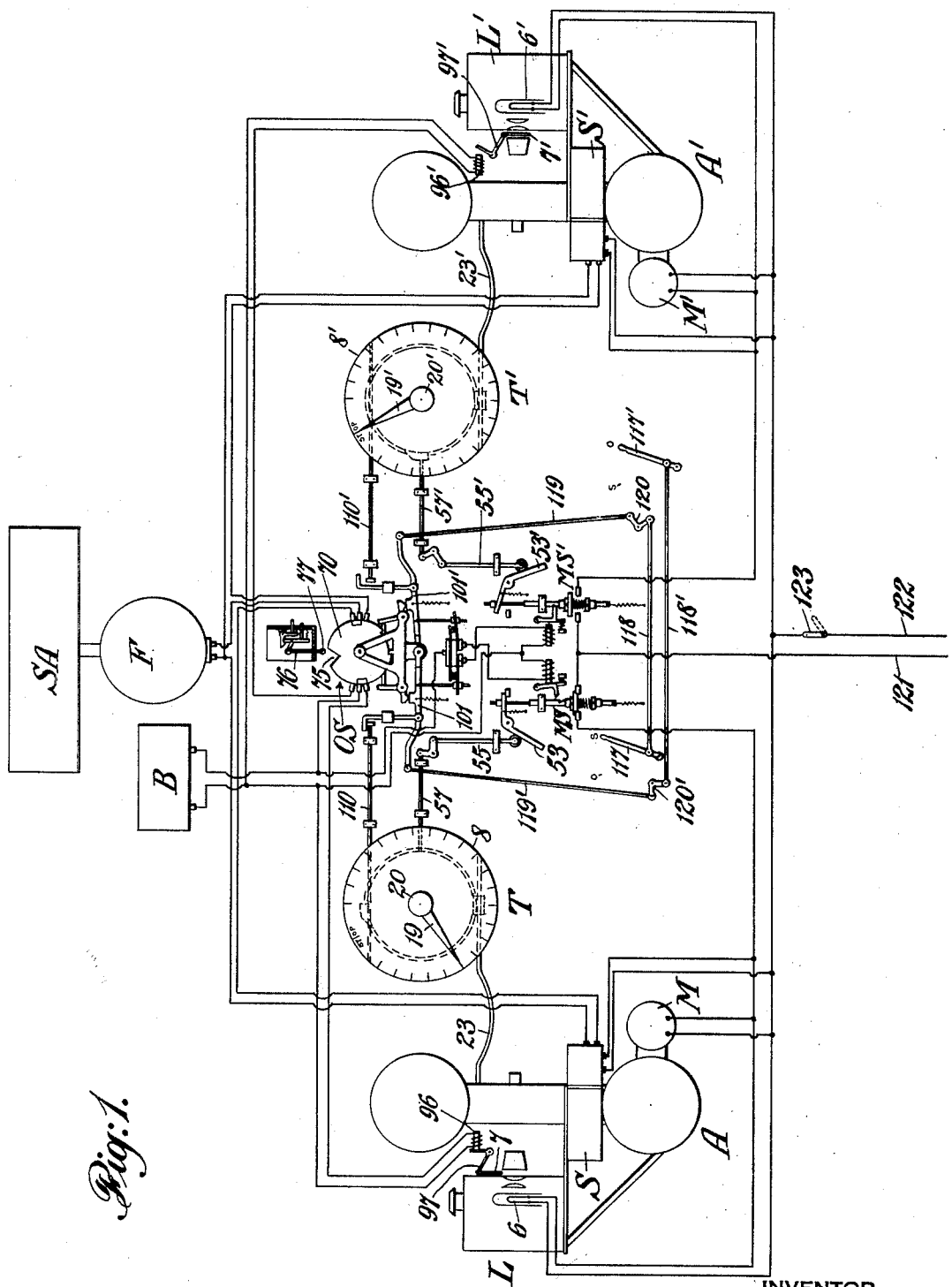

In Fig. 1, A, A', represent two projectors adapted to project moving pictures on a common screen in the usual manner. These projectors may be of any usual or preferred construction, and will obviously comprise among their members, upper and lower reels, indicated for example at 1 and 2 in Fig. 8, for supplying and winding the film, which may be of any usual or preferred form, but is for the purposes of this specification assumed to be the standard release print with or without the timer footage marked thereon. In the arrangement shown in Fig. 8, the film, which is provided with the usual marginal perforations, engages the upper and lower driving sprockets, indicated at 3 and 4, respectively, and constituting what I term the record drive mechanism, or record drive, the record being in this instance the standard film indicated at 5. The record drive mechanism of each projector is independently driven by a suitable prime mover. In this instance each projector is provided with an independent motor, said motors being indicated at M and M', respectively. Each motor is connected with the record drive of its projector in any usual or desired manner, and will therefore operate the driving sprockets, 3 and 4, of each projector. I prefer to use a separate electric motor for each projector, for the reason that an electric motor starts comparatively slowly and increases in speed gradually until it arrives at its normal driving speed, and thus avoids a sudden application of power to the film, which might otherwise tear it, but I do not limit myself to this construction, as both projectors may be driven from a common motor, and the record drive mechanism may be brought gradually to normal speed in any usual or desired manner. Each projector will be provided with the usual lamp box, indicated at L, L', respectively, each provided with a projecting lamp 6, and dowser, 7. Where the projection of the moving picture is accompanied by sound effects, each projector will be provided with sound mechanism, indicated at S, S', respectively, electrically connected with sound amplifying apparatus, SA, in Fig. 1, through a fader, F, in the usual or well known manner. The specific construction of these details form no part of my present invention and will not be further described, it being understood that the sound apparatus will be controlled in synchronism with the pictures on the film, either by means of a phonographic record disc, or by a sound track on the film. It will be understood that the two projectors will be arranged side by side in the projecting room, with their respective lenses in registration with suitable openings in the front wall thereof, leaving room for the operator between the projectors. The automatic control apparatus now to be described is preferably located on the front wall of the projecting room midway between the projectors and at a considerable distance from each so that all danger of film fire due to arcing is practically avoided and room is provided for the operation of both projectors by a single operator. On the operating panel, which is illustrated in the central portion of Fig. 1, are two timers, T, T', each of which is operatively driven in timed relation with the record drive of one projector and controls the operation of the other projector through suitable switch mechanism indicated in Fig. 1, and conveniently arranged between the timers. The timers are exactly alike in construction, and a description of one will suffice for both. The corresponding parts of the other timer have been given the same reference numerals with the addition of a prime.

One of the timers, as for example, the timer, T, is illustrated in detail in Figs. 3, 4, 5 and 6. In the present instance it comprises a housing, 8, of cylindrical form provided with a front index plate, 9, a back plate, 10, and an intermediate partition, 11, through which extends a central shaft, 12, rotatably and also longitudinally movable. Rigidly attached to the shaft 12, and located preferably between the partition, 11, and index plate, 9, is a rotatable control member, 13, which is adapted to be rotated in timed relation with the record drive mechanism of the connected projector. In this instance I have shown the timer provided in rear of the partition, 11, of its housing with a worm wheel, 14, mounted on a sleeve, 15, journaled in suitable bearings in the housing, and provided with a clutch member, 16. The clutch member, 16, is engaged by a clutch member, 17, on the shaft, 12, and is held normally in operative relation therewith, by a spring, 18, interposed between the control disc, 13, and the partition, 11, or in any other desired yielding manner. The timer shaft, 12, is provided on the front of the housing with a pointer, indicated at 19, and manual setting device, or button, 20, both of which are rigidly secured to the shaft. By means of the button the shaft, together with the pointer and the control disc, 13, can be moved inwardly far enough to release the engagement of clutch members, 17, 16, and thus permit the pointer and control disc to be set rotarily to any desired position. Within the housing, 8, is a worm shaft, 21, carrying a worm, 22, engaging the worm wheel, 14, for driving the worm wheel and imparting rotary motion in a counter-clockwise direction to the pointer, and the control disc or member, when the clutch members, 16, 17, are in engagement. The timer driving shaft, 21, is connected operatively with a rotary part of the record drive of the connected projector, preferably by means of a flexible shaft, indicated at 23, one end of which is connected to the shaft, 21, while the other end is connected in this instance to the shaft of the upper film feed sprocket, 3, as indicated for example in Fig. 9. The shaft, 24, of the film feed sprocket is provided with a beveled gear, 25, meshing with a horizontal beveled gear, 26, operatively connected with the motor, M, of the projector, A, and said shaft, 24, is also provided with a smaller beveled gear, 27, meshing with a vertical beveled gear, 28, on a shaft, 29, to which a flexible shaft, 23, leading to the timer operating shaft, 21, is in this instance connected, but obviously this specific construction may be varied to suit the ideas of different constructors.

The index plate, 9, of the timer is provided with a series of circularly arranged indications operating in conjunction with pointer, 19, to indicate the footage of film withdrawn from the supply roll, 2, by the record drive mechanism, and specifically in this instance the upper drive sprocket, 3. The ordinary standard film now contains thereon certain indications or "cues" to guide the operator in placing the film into position, and in effecting a change over by hand operated means. In Fig. 10 I have illustrated a plan view of portions of a film showing these indications. Thus, in this figure, the film proper is indicated at 5, and comprises the following integral portions. 30 represents what is termed the protective leader, and 30a represents the identification leader, both located between the leading end of the film and a blank portion, 31 indicating the picture start, which is to be brought just past the lamps when the film is placed in the projector. Following the picture start cue, the film is provided with a synchronizing leader portion, 32, between the picture start cue and the first picture, indicated at 33. At a point twelve feet from the last picture the film is provided with a motor start cue which is given by a dot in the upper corner of each of four successive pictures, the first dot, indicated at 34, being in a picture twelve feet from the last picture, a second cue similarly provided for by dots in four successive pictures indicating the change over position. The dot in the first of these four pictures constituting this change over cue, is indicated at 35. After the last picture, 36, the standard film includes the run out trailer, 37, identification trailer, 37a, and protective trailer, 37b. The line 40—41 in Fig. 10 indicates the respective lengths of the several portions of the standard film, with the above mentioned exception of the length of the portion occupied by the pictures, which varies with different films, but will not under any circumstances exceed 1100 feet. This distance can be exactly measured before the projection, by a suitable film measuring device of well known construction, and marked on the film, or noted in connection therewith, for the information of the operator. I prefer that the film should be measured at the time it is manufactured, and that the footage represented by the line 38—39 should be marked in figures in a small oblong half the size of a picture immediately following the picture start indication, 31, as indicated at 42. The index plate, 9, of the timer is conveniently divided into twelve sections, each representing a traverse of the pointer in timed relation with one hundred feet of film passing over the film drive sprocket, and these indications are marked from zero up to 1100 successively in clockwise direction, leaving a space between the 1100 indication and zero, in the center of which is marked the word "stop". Between these primary indications may be placed sub-indications indicating fractions of 100 feet.

It will be readily seen that assuming that the distance measured on the film to be shown by projector A, for example, and indicated at lines 38—39, is 850 feet, the pointer, 19, can be quickly disassociated from the driving worm gear, 14, by pressing the button, 20, inwardly, and brought to a position midway between the 800 and 900 indications, and when the projector is started, the indicator will move in a counter-clockwise direction and arrive at the zero position coincidentally with the arrival of the change over cue or position, at projecting position before the lens.

The control disc, 13, of each timer is provided with suitable mechanism for controlling the operation of the other projector, in the manner hereinafter described, through certain switches and operating connections, one form of which is herein illustrated and will now be described. For this purpose the disc, 13, is shown in this instance as provided with a motor start and change over pin, 43, located in substantially the same radial position with respect to the shaft, as the pointer, 19, and a motor stop cam, 44, adjustably secured to the disc by screws, 45, extending through a curved slot, 46, in the disc for adjusting the relative position between this cam and the pointer, 19. The switch mechanisms operated by the timers are preferably located as before stated, on a panel between the timers, and include independent motor control switches, MS and MS', controlling respectively the motors, M and M', and an oscillating disc switch, indicated at OS, for instantaneously changing the circuit connections for the respective sound effect apparatus of the two projectors, and simultaneously controlling the dowsers.

Referring now to the motor switches, MS and MS', the construction of which is identical, a description of one will therefore answer for both. The switch proper which is of the friction contact or knife switch type, comprises a pair of contacts, 47, adapted to be engaged frictionally by a blade, 48, which is slidingly mounted upon and insulated from a vertical switch rod, 49, having its lower end connected by a depressing spring, 50, with a fixed point on the panel. The upper end of the switch rod, 49, extends through a fixed guide, 51, and is operatively connected with an arm, 52, of a bell crank lever, the other arm, 53, of which is engaged by a roller, 54, on a push rod, 55, connected by a bell crank, 56, with a horizontal push rod, 57, mounted in suitable guides, and having its free end extending to a point within the travel of the inclined face of the motor stop cam, 44, on the adjacent timer control disc. A spring, 58, holds the bell crank arm, 52, in its lowermost position against a stop, 59. It will be seen that by pressing the other bell crank arm, 53, downwardly and inwardly, the switch rod, 49, will be elevated, and I have shown a spring pawl, 60, adapted to engage a notch, 61, in the switch rod, 49, for locking it in its upper position. In order to insure the instantaneous withdrawal of the switch blade, 48, from the friction contacts, 47, to avoid arcing, the switch rod, 49, is provided below the blade, 48, with a lifting spring, 62, the tension of which can be adjusted by means of a nut, 63, on an insulated sleeve, 64, extending through an aperture in the blade, 48, so that when the rod, 49, is raised the lifting spring, 62, will be compressed until the resistance thereof is sufficient to overcome the frictional engagement between the blade, 48, and contacts, 47, when the blade will be snapped out of engagement with the contacts. The motor switch is placed in operative position by releasing the pawl, 60, and this is accomplished by means of an electromagnet, 65. The parts of the motor switch, MS', which are identical with the parts just described, have been given the same reference numerals with the addition of a prime.

The pawl releasing magnet, 65, is operated by means of normally separated contacts, 66', under the control of the timer T', when the apparatus is in operation, and the magnet, 65' is controlled by similar contacts, 66, normally operated by the timer, T, as hereinafter described. These contacts are preferably carried by flexible plates, 67, 68 and 67', 68'.

Figure 2:
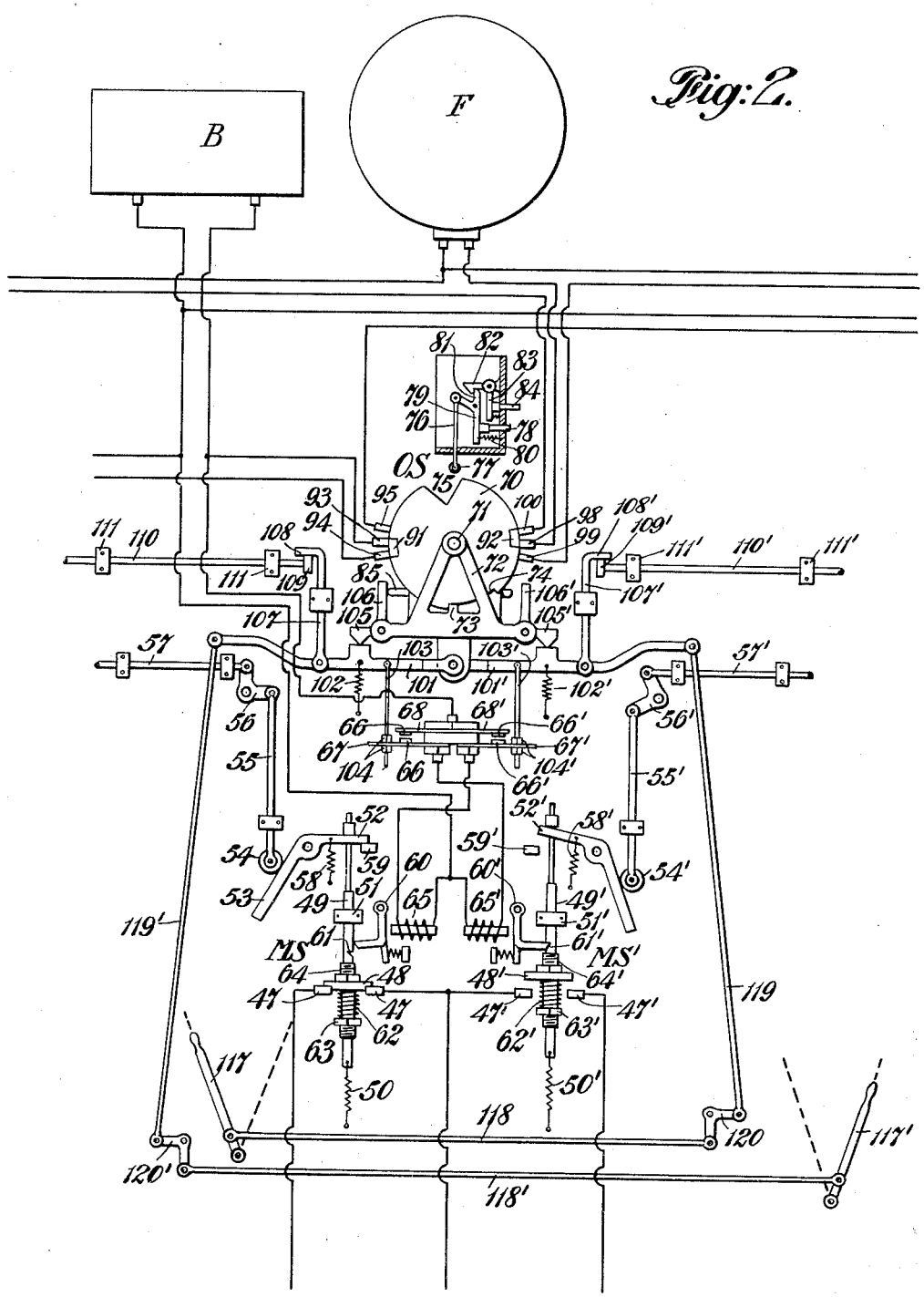
Fig. 2 is an enlarged view of the centrally located switch mechanisms operated by the timers as illustrated in Fig. 1.
Figure 3:
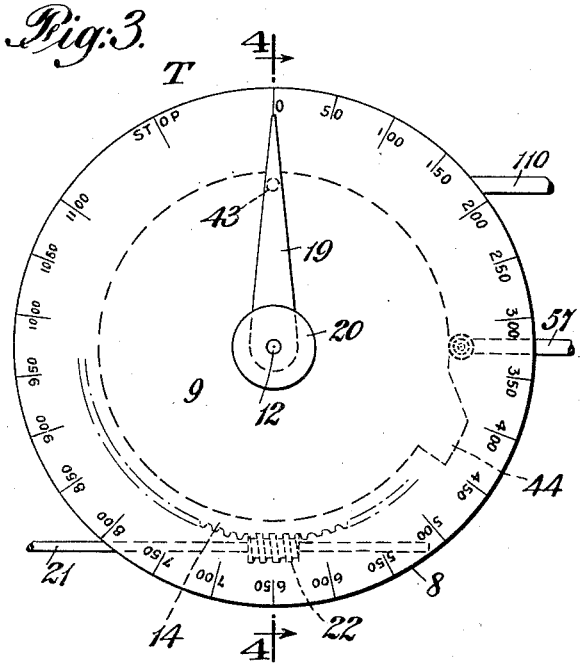
Fig. 3 is an enlarged front view of one of the timers.
Figure 4:
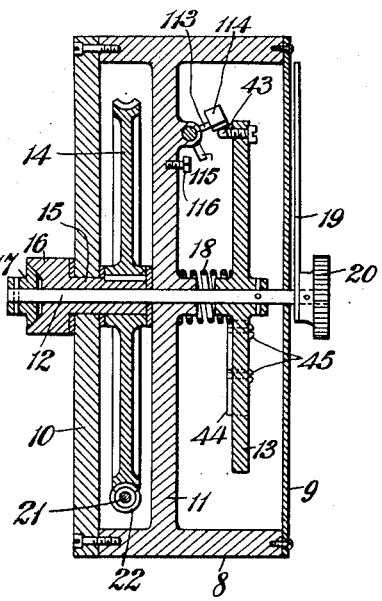
Fig. 4 is a vertical section of the timer, on line 4—4 of Fig. 3.

Above the contacts just referred to is located the oscillating switch, OS, provided with the oscillating switch or disc member, 70, preferably of insulating material, mounted on a shaft, 71, supported in a frame, 72, secured to the panel, the frame being provided with a projection, 73, engaging a notch 74, in the disc, to limit the extent of its oscillation. For the purpose of locking the disc in a central inoperative position when the apparatus is not in operation, I provide the upper portion of the disc with a V-shaped notch, indicated at 75, adapted to be engaged by a vertically movable stop rod, 76, carrying at its lower end a roller, 77, capable of projecting into the V-shaped notch, and forcing the disc into a central position between its limits of oscillation. This stop rod is operated manually and for this purpose I have illustrated a double push button arrangement, one button, 78, being connected with a bell crank lever, 79, having one arm connected with the stop rod, and the other arm with a depressing spring, 80. The bell crank lever 79 is provided with a third arm, 81, adapted to be engaged by a hook latch, 82, having a releasing arm, 83, to which the other push button, 84, is connected. The construction and operation of the oscillating switch will be best understood from an examination of Fig. 7, which shows a rear view of the apparatus illustrated in front elevation in Fig. 2. The frame, 72, in this switch apparatus is provided with a horizontal slide bar, 85, projecting at opposite sides of the disc and carrying a spring shifting device, 86, to which one end of a tension spring, 87, is connected, the other end of said spring being connected at 88, to the disc, 70, in a radial line passing through the center of the V-shaped notch, 75. The slide bar, 85, is limited in its movement in this instance by an elongated horizontal slot 90a in an arm, 90, engaging the shaft, 71, and the range of movement is sufficient to carry the spring support, 86, from one side of the center of the disc to the other, so as to secure a quick shifting of the disc, 70, from one extreme position to the other. The disc, 70 is provided on opposite portions of its periphery with contacts, 91 and 92, respectively, the contact, 91 controlling the dowsers of the respective projectors, and the contact, 92, controlling the circuits for the sound effects. The contact, 91, is at all times in engagement with a centrally located fixed contact connected by suitable wiring with a source of electrical power, as a battery, B, which in this instance supplies power for operating the dowser magnets, and also the magnets, 65, 65'. On opposite sides of the central contact, 93, are fixed contacts, 94 and 95. The contact, 94, is operatively connected in a circuit extending to a dowser operating magnet, 96, for operating dowser, 7, for the projector, A, in a direction to move it to open position, as shown in Fig. 1, through a bell crank lever, 97. The contact, 95, is in circuit with a dowser operating magnet, 96', for operating the dowser, 7', of the projector, A', through a bell crank lever, 97'. The contact, 92, on the disc, 70, is at all times in contact with a central fixed contact, 98, and is adapted to connect it respectively with a fixed contact, 99, in a circuit connecting the sound mechanism of projector, A', with the fader, F, and sound amplifier, SA, or with a fixed contact, 100, in a circuit connecting the sound mechanism of projector, A, with the fader, F, and sound amplifier, SA, the contact, 98, being connected with a wire common to both circuits.

Connections are provided from each timer through the switch apparatus for the purpose of starting the record drive of the other projecting apparatus in advance of the change over position, in order that it may arrive at normal speed by the time the film reaches the change over position, at which point exactly the disc, 70, is shifted from one extreme position to the other. As the operating connections between each timer and the switch mechanisms are the same, a description of one will suffice for both, and the corresponding parts of the other will be indicated by the same reference characters, with the addition of a prime. Pivotally supported below the frame, 72, of the switch, OS, at each side of the frame, is a horizontally disposed lever, 101, provided with a depressing spring, 102, for holding it and its connected parts normally in its lowest position. A link rod, 103, connects the lever, 101, with the flexible plate, 67, carrying the contacts, 66, and the connection between the link rod, 103, and the plate, 67, is capable of accurate adjustment by means of nuts, 104, by means of which the amount of time elapsing between the starting of the motor and the arrival of the film at the change over position may be varied to suit the requirements of the particular motor employed, as some motors arrive at normal speed more quickly than others.

The lever, 101, is also provided with means for shifting the slide bar, 85, carrying the lower end of the spring, 87, from one extreme position to the other. This is accomplished in the present instance by means of a bell crank lever having a horizontal arm, 105, engaging a part connected with the lever, 101, and a vertical arm, 106, adapted to engage one end of the sliding bar, 85.

Figure 5:
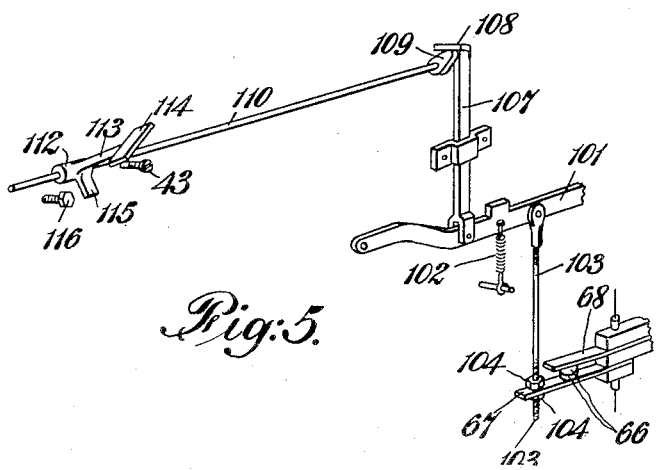
Fig. 5 is a detail perspective view of parts shown in Fig. 4.
Figure 6:
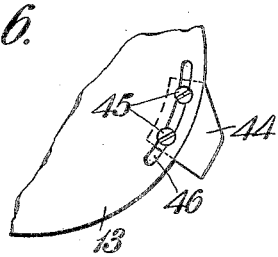
Fig. 6 is a detail of the motor switch operating cam.

The lever, 101, is provided with a vertical lifting rod, 107, mounted in a suitable guide on the panel and provided at its upper end with a horizontal projection, 108. This projection extends over an oval shaped cam, 109, rigidly secured to a rock shaft, 110, mounted in suitable bearings, 111, and adapted to be rocked by the motor start and change over pin, 43, on the disc, 13, of the adjacent timer. Referring particularly to Fig. 5, on the rock shaft, 110, is a sleeve, 112, provided with an arm, 113, carrying an inclined cam plate, 114, adapted to be engaged by the pin, 43, thus raising the arm, 113, and rocking the cam, 109, to effect the lifting of lever, 101, as will clearly appear in Fig. 5. The sleeve, 112, is conveniently provided with a stop arm, 115, for engaging an adjustable stop pin, 116, to limit the return movement of the rock shaft, 110, after the pin, 43, has passed beneath the cam plate, 114.

The cam plate, 114, is so located that it will be engaged by the pin, 43, when the pointer of the contiguous timer arrives at a point at a predetermined distance before zero, in this instance at the indication 50, which indicates that fifty feet of the film still remain to be projected before the change over point is reached. As soon as the pin, 43, engages the cam plate, 114, the rock shaft, 110, will be rocked and the cam, 109, will begin to raise the vertical lift rod, 107, carrying with it the lever, 101, and bringing the contacts, 66, into engagement to energize the pawl releasing magnet, 65', controlled by these contacts, and withdraw the pawl, 60', from the notch, 61', in the switch rod, 49', controlling the motor, M', of the projector, A'. As soon as the pawl, 60', is released, the spring, 50', will pull down the rod, 49', and close the motor switch, MS', and start the motor of the inoperative projector, in this instance, A'. The further movement of the cam, 109, continues to raise the lever, 101, and gradually pushes, through the bell crank arms, 105, 106, the slide bar, 85, until at the moment the pin, 43, elevates the cam, 114, to its highest position, at which time the time pointer will be at zero, the slide rod, 85, has been moved far enough to change the position of the spring, 87, to the opposite side of the axis of the disc, 70, and the disc thereupon instantly shifts, closing the dowser of the projector, A, and opening the dowser of projector, A', and simultaneously shifting the sound circuit controlling contacts, as will be readily understood. The motor for the projector, which has been put out of operation, will thereafter continue to run until the pointer of the timer reaches the point marked stop, during which time the cam, 44, will effect the endwise movement of the rod, 57, depressing the rod, 55, which in turn, through the bell crank 53—52, elevates the motor switch rod, 49, for the motor, M, and locks it in position by means of its pawl, 60, the switch blade, 48, of the switch, MS, being withdrawn from its contacts by the spring, 62, in the manner previously described. Then the motor, M, will stop, and the projector, A, is in position to permit the operator to change the reels.

Either motor can be manually stopped at any time by simply pushing in the arm, 53 or 53', as the case may be, and obviously both of the switches, MS and MS', will be in open position when the apparatus is not in use. A projection may be commenced with either projector, and for convenience I have shown manual starting switch levers, indicated at 117 and 117'. The lever, 117, can be used to start the motor, M, for projector, A, and in this instance is connected by link rods, 118 and 119, and bell crank, 120, with the arm, 101'. The lever, 117', is connected in like manner by rods, 118' and 119', and bell crank, 120', with the arm, 101.

In the accompanying drawings I have indicated, diagrammatically, the electric circuits for the various parts in such clear manner that it is believed to be unnecessary to particularly describe the wiring or indicate the various lines by reference characters. It may be stated, however, that the wires, 121 and 122, represent the connections from any ordinary power line for operating the motors and sound effects, and controlled by a master switch, 123, in the line wire, 122.

In describing the operation of the entire apparatus, it may be assumed that the motor switches, MS and MS' are both in open position, and that the oscillating change over switch, OS, is likewise in neutral position, with the locking roller, 77, at the bottom of the V shaped notch, 75, the contacts, 91 and 92, being in engagement only with contacts, 93 and 98 respectively. The operator is therefore at liberty to start the operation of either projector for the first film section, but it will be assumed that the projector, A, is the first to be placed in operation. A film the footage of which between the picture start position and the change over position has been previously ascertained and noted, preferably on the film itself, is placed in projector, A, in the usual manner, and the timer, T, is set to indicate the predetermined footage, which it will be assumed in this instance is 850 feet. The timer, T, is accordingly set, as shown in Fig. 1, with the pointer on the indication for 850 feet. The operator will then shift the start lever, 117, to the right, thereby raising the lever, 101', which immediately brings contacts, 66' together, actuating the magnet, 65, to withdraw the locking pawl, 60, permitting the closing of motor switch, MS, and starting the motor, M. At the same time the elevation of lever, 101', will, through the bell crank, 105' and 106', move the slide rod, 85, to the left in Fig. 1 (to the right in Fig. 7 which shows a rear view of the same). This will shift the lower end of the spring, 87, to the left of the center of the disc, 70, and while the motor is attaining speed during the reeling off of the portion, 32, of the film, the operator will press the push button, 78, raising the locking roll, 77, out of the V-shaped locking notch, 75, in the disc, 70, where it will be held by the latch, 82. Instantly the spring, 87, brings the disc, 70, to the left, bringing the contact, 91, into position to close the dowser circuit, through contact, 94, and magnet, 96, for projector, A, to open the dowser, 7, and simultaneously closing the sound circuit through contacts, 92 and 100, to connect the sound apparatus, S, of projector, A, with the fader, F, and amplifier, SA. The projection of the film by projector, A, with synchronized sound effects, will proceed without further attention of the operator. Fig. 1 shows the parts in this position, just as the projector has commenced operating. The operator is free to insert the second section of the film in the projector, A', moving it to the picture start position, and setting the pointer of the timer, T', to a point on the indicator dial corresponding with the footage of this film, which we will assume is 900 feet, between the picture start and change over points therein.

The continued operation of projector, A, is accompanied by the continued synchronous movement of the pointer, 19, and control disc, 13, of the timer, T. When the pointer reaches a point on the dial indicating, say fifty feet, from the change over point on the film, the motor start and change over pin, 43, will, in the manner previously described, engage the cam plate, 114, and effect the rocking of shaft, 110. This effects first the closing of circuit through contacts, 66, and magnet, 65', releasing the pawl, 60', and permitting the spring, 50', to close the motor circuit switch, MS', and start the motor, M', of projector, A', which attains normal speed during the reeling off of the portion, 32, of its film. While the motor, M', is gaining speed, the lever, 101, is being further raised and effects the shifting of the slide bar, 85, to the right in Fig. 1 (to the left in Fig. 7), transferring the line of spring, 87, to the opposite side of the axis of the disc, 70, and as the pointer of timer, T, reaches the zero position, the disc, 70, is shifted to the right, the contact, 91, breaking the dowser circuit, through magnet, 96, permitting the dowser, 7, to close, and simultaneously making the dowser circuit through magnet, 96', and opening the dowser, 7'. Simultaneously, the contact, 92, is shifted from contact, 99, to contact, 100, cutting out the sound circuit of projector, A, and making the sound circuit for projector, A'. The second section of the film will then be projected with sound effects by the projector, A'. Meanwhile the projector, A, is still in operation for a few seconds, carrying the pointer beyond zero to the point marked "stop" and during this period bringing the cam, 44, into contact with the push rod, 57, to stop the motor, M, of projector, A, in the manner previously described, the motor switch, MS, being returned to open position and locked by its pawl, 60.

The operator is now free to insert the third section of the film in projector, A. This film, likewise, will have its footage determined and the pointer of the timer, T, will be set to indicate such footage, and the operation continues, so that successive film sections are projected by the several projectors in perfect sequence and without any manual operation or any special attention from the operator at the change over points. The change over will also take place with the utmost accuracy, in fact with much greater accuracy than can be uniformly obtained by manual operation.

It will be noted that all the switches controlling the electric connections are located on the central panel at points considerably removed from the projectors, so that even if arcing should occur at any of the switches, there will be no danger of film fire. It will also be seen that the breaking of any film during projection cannot have the effect of bringing about the premature change over as the operator can instantly stop the motor for the projector which is in operation by manually operating the adjacent lever, 53, to open the motor switch, and repair the film, so that the remaining portion of the film will be projected and the change over will occur at the proper point for which the appropriate timer was set.

Obviously the details of the specific mechanism herein shown and described by means of which the timers effectively control their respective motors and the change over connections may be varied to a considerable extent, and I do not limit myself to the specific details of these parts.

It will also be understood that my invention is applicable to the control of any type of records to produce consecutive operation thereof, whether they are impressed upon a film or strip, as a picture film or sound record film, or upon a disc, as in the case of a phonograph disc. Thus in Fig. 11, for example, I have illustrated two sound apparatuses, S2, S3, operating by means of turn tables and phonograph discs, indicated at D, D', and suitably connected with sound amplifying means, S'A', through a fader F', in any well known manner, the record driving means for each disc being connected to an adjacent timer, which timers are indicated at T2 and T3, respectively, provided with control mechanism, indicated as a whole at C', constructed substantially in accordance with the panel switch mechanism illustrated in the central portion of Fig. 1 and in Fig. 2. In fact, this switch apparatus may be identical with that shown in Figs. 1 and 2, except that the dowser contacts and their circuits may be omitted. The apparatus thus diagrammatically illustrated in Fig. 11 can be employed for reproducing a lengthy dialogue or musical composition comprising a plurality of disc records, it being only necessary to measure these records between the starting point and the change over point thereon and setting the pointers of the respective timers accordingly.

What I claim and desire to secure by Letters Patent is:—

1. The combination of a pair of projectors, each provided with record drive mechanism, a dowser, and electrically operated control mechanism therefor, a timer for each projector comprising a rotatable control element operatively connected in timed relation with the record drive mechanism thereof, a pointer and scale for indicating the positions of said element, means for disconnecting said control element from its driving means to enable it to be set in accordance with a measured portion of the record to be driven by its connected record drive mechanism, a motor start and change over part carried by said control element, mechanism operated thereby for starting the record drive mechanism of the other projector, and switch mechanism operated by said motor start and change over part for controlling simultaneously the dowser control mechanisms of both projectors to effect a change over.

2. The combination of a pair of projectors, each provided with record drive mechanism, a dowser, and electrically operated control mechanism therefor, a timer for each projector comprising a rotatable control element operatively connected in timed relation with the record drive mechanism thereof, a pointer and scale for indicating the positions of said element, means for disconnecting said control element from its driving means to enable it to be set in accordance with a measured portion of the record to be driven by its connected record drive mechanism, a motor start and change over part carried by said control element, mechanism operated thereby for starting the record drive mechanism of the other projector, and switch mechanism operated by said motor start and change over part for controlling simultaneously the dowser control mechanisms of both projectors to effect a change over, and a stop cam carried by said control element, for effecting the stopping of the connected record drive mechanism, after the change over has been effected.

3. The combination of a pair of record drive mechanisms, an independent motor for each record drive mechanism, a separate timer each having a rotary control element connected with one of said record drive mechanisms in timed relation therewith, a pointer and indicator scale for said control element, means for normally setting said control member, in accordance with a measured portion of a record to be driven, a spring actuated motor control switch, for each of said motors, switch opening means for moving each of said switches to open position, locking means for holding each of said switches in open position, tripping means for each of said locking means, the control element of the timer for each record drive mechanism having a motor start device for operating the tripping means of the motor control switch of the motor for the other record drive mechanism.

4. The combination of a pair of record drive mechanisms, an independent motor for each record drive mechanism, a separate timer each having a rotary control element connected with one of said record drive mechanisms in timed relation therewith, a pointer and indicator scale for said control element, means for normally setting said control member, in accordance with a measured portion of a record to be driven, a spring actuated motor control switch, for each of said motors, switch opening means for moving each of said switches to open position, locking means for holding each of said switches in open position, tripping means for each of said locking means, the control element of the timer for each record drive mechanism having a motor start device for operating the tripping means of the motor control switch of the motor for the other record drive mechanism, and a motor stop device for operating the switch opening means of the motor for its connected record drive mechanism.

5. The combination with a pair of projectors, each provided with a film driving mechanism, an independent motor therefor, a dowser, and electrically actuated control mechanism therefor, of a separate timer for each projector, comprising a rotary control element, connected with the film drive mechanism of the projector for operation in timed relation, and provided with a motor start and change over device, and a motor stop device, a pointer and indicating scale, and means for disconnecting said control element from its connected drive and setting it in accordance with a measured length of the film to be shown, an independent motor switch for each motor, change over switch mechanism for controlling the dowsers of both projectors, connections operable by the motor start and change over device of each timer for effecting the closing of the motor switch for the motor of the other projector in advance of the change over, and for shifting the change over switch mechanism controlling the dowsers, at the change over position, and connections operable by the motor stop device of each timer for opening the motor switch for its connected motor.

6. The combination with a pair of projectors, each provided with a film driving mechanism, an independent motor therefor, a dowser, and electrically actuated control mechanism therefor, of a separate timer for each projector, comprising a rotary control element, connected with the film drive mechanism of the projector for operation in timed relation, and provided with a motor start and change over device, and a motor stop device, a pointer and indicating scale, and means for disconnecting said control element from its connected drive and setting it in accordance with a measured length of the film to be shown, sound mechanism for each projector operated in synchronism with the film projected thereby, a common sound amplifying means for both sound mechanisms, an independent motor switch for each of said motors, change over switch mechanism for controlling the dowser actuating mechanisms of both projectors and for connecting the sound mechanisms thereof separately with the sound amplifying mechanism, connections operable by the motor start and change over device of each timer for effecting the closing of the motor switch for the motor of the other projector in advance of the change over position and of said rotary control element, and for shifting the change over switch at the change over position of said control element, and connections operable by the motor stop device of each timer for opening the motor switch for its connected motor.

7. The combination with a pair of projectors, each provided with a film driving mechanism, an independent motor therefor, of a separate timer for each projector, comprising a rotary control element, connected with the film drive mechanism of the projector for operation in timed relation, and provided with a motor start and change over device, and a motor stop device, a pointer and indicator scale, and means for disconnecting said control element from its connected drive and setting it in accordance with a measured length of the film to be shown, an independent motor switch for each motor, a change over switch for controlling the dowsers of both projectors, comprising an oscillating switch member, a reciprocable part, an actuating tension spring connected to said switch member, and to said reciprocatable part and movable thereby to bring the line of tension of said spring to one side or the other of the axis of said switch member, connections operable by said motor start and change over device of each timer to effect the closing of the motor switch for the motor of the other projector before the said control element reaches the change over position and the movement of said reciprocatable part into position to effect a shift of said oscillating switch element by its actuating spring at the change over position of said control element.

8. The combination with a pair of projectors, each provided with a film driving mechanism, an independent motor therefor, of a separate timer for each projector, comprising a rotary control element, connected with the film drive mechanism of the projector for operation in timed relation, and provided with a motor start and change over device, and a motor stop device, a pointer and indicating scale, and means for disconnecting said control element from its connected drive and setting it in accordance with a measured length of the film to be shown, an independent motor switch for each motor, a change over switch for controlling the dowsers of both projectors, comprising an oscillating switch member, a reciprocatable part, an actuating tension spring connected to said switch member, and to said reciprocatable part and movable thereby to bring the line of tension of said spring to one side or the other of the axis of said switch member, connections operable by said motor start and change over device of each timer to effect the closing of the motor switch for the motor of the other projector before the said control element reaches the change over position and the movement of said reciprocatable part into position to effect a shift of said oscillating switch element by its actuating spring at the change over position of said control element, and connections operable by the motor stop device on said control element of each timer for opening the motor switch for the motor connected therewith.

9. The combination with a pair of projectors, each provided with a film driving mechanism, an independent motor therefor, a dowser, and electrically actuated control mechanism therefor, of a separate timer for each projector, comprising a rotary control element, connected with the film drive mechanism of the projector for operation in timed relation, and provided with a motor start and change over device, and a motor stop device, a pointer and indicating scale, and means for disconnecting said control element from its connected drive and setting it in accordance with a measured length of the film to be shown, sound mechanism for each projector operated in synchronism with the film projected thereby, a common sound amplifying means for both sound mechanisms, an independent motor switch for each of said motors, change over switch mechanism including an oscillating switch member, a reciprocatable part, an actuating tension spring connected at one end to said switch member and at the other end to said reciprocatable part, and movable thereby to bring the line of tension of said spring on one side or the other of the axis of said switch member, contacts carried by said switch member and cooperating fixed contacts for effecting the control of said dowser actuating mechanisms, and simultaneously connecting said sound amplifying means with the sound mechanisms of one or other of said projectors, connections operable by the motor start and change over device of each timer for closing the motor switch for starting the other projector and moving said reciprocatable part into position to effect a shift of said oscillating switch member by its oscillating spring when the said control element reaches the change over position, and connections operable by the motor stop device on said control element of each timer for closing the motor switch for the motor connected therewith.

10. The combination with a pair of projectors, each provided with a film driving mechanism, an independent motor therefor, a dowser, and electrically actuated control mechanism therefor, of a separate timer for each projector, comprising a rotary control element, connected with the film drive mechanism of the projector for operation in timed relation, and provided with a motor start and change over device, and a motor stop device, a pointer and indicating scale, and means for disconnecting said control element from its connected drive and setting it in accordance with a measured length of the film to be shown, sound mechanism for each projector operated in synchronism with the film projected thereby, a common sound amplifying means for both sound mechanisms, an independent motor switch for each of said motors, each of said switches comprising fixed and movable contacts and being provided with a switch closing spring, a switch opening means, a spring interposed between said opening means and the movable switch contact, locking means for holding said movable contact in open position, an electromagnetic trip for said locking means and normally separated trip contacts for operating said trip, change over switch mechanism comprising an oscillating switch member provided with contacts, a reciprocatable part, an actuating tension spring connected to said switch member and to said reciprocatable part and movable thereby to carry the line of tension of said spring to one side or the other of the axis of said switch member, fixed contacts cooperating with the contacts on said switch member for simultaneously controlling the dowsers, and connecting the sound amplifying means with the sound mechanism of one or other of said projectors, connections operable by the motor start and change over device of each timer, for closing the trip contacts for effecting the starting of the motor of the other projector, in advance of the change over position of the control element, and for moving said reciprocatable part to effect a shift of the change over switch, at the change over position of said control element, and connections operable by the motor stop device of each timer to operate the switch opening means of the motor switch for the motor connected therewith.

11. The combination with a pair of projectors, each provided with a film driving mechanism, an independent motor therefor, a dowser, and electrically actuated control mechanism therefor, of a separate timer for each projector, comprising a rotary control element, connected with the film drive mechanism of the projector for operation in timed relation, and provided with a motor start and change over device, and a motor stop device, a pointer and indicating scale, and means for disconnecting said control element from its connected drive and setting it in accordance with a measured length of the film to be shown, sound mechanism for each projector operated in synchronism with the film projected thereby, a common sound amplifying means for both sound mechanisms, an independent motor switch for each of said motors, each of said switches comprising fixed and movable contacts and being provided with a switch closing spring, a switch opening means, a spring interposed between said opening means and the movable switch contact, locking means for holding said movable contact in open position, an electromagnetic trip for said locking means and normally separated trip contacts for operating said trip, change over switch mechanism comprising an oscillating switch member provided with contacts, a reciprocatable part, an actuating tension spring connected to said switch member and to said reciprocatable part and movable thereby to carry the line of tension of said spring to one side or the other of the axis of said switch member, fixed contacts cooperating with the contacts on said switch member for simultaneously controlling the dowsers, and connecting the sound amplifying means with the sound mechanism of one or other of said projectors, connections operable by the motor start and change over device of each timer, for closing the trip contacts for effecting the starting of the motor of the other projector, in advance of the change over position of the control element, and for moving said reciprocatable part to effect a shift of the change over switch, at the change over position of said control element, and connections operable by the motor stop device of each timer to operate the switch opening means of the motor switch for the motor connected therewith, hand operated locking means for locking said oscillating switch member in neutral position between the extremes of movement, and means for manually operating said connections.

In testimony whereof I affix my signature.

LAWRENCE E. BROCIUS.